US009625987B1

(12) United States Patent
LaPenna et al.

(10) Patent No.: US 9,625,987 B1
(45) Date of Patent: Apr. 18, 2017

(54) UPDATING AND DISPLAYING INFORMATION IN DIFFERENT POWER MODES

(71) Applicant: Google Inc., Mountain View, CA (US)

(72) Inventors: Joseph LaPenna, San Francisco, CA (US); Justin Koh, Mountain View, CA (US); Melissa Frank, Los Altos, CA (US); Peter Wilhelm Ludwig, San Francisco, CA (US); Jeffrey Hoefs, San Francisco, CA (US); Jeffrey Michel Brown, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/821,048

(22) Filed: Aug. 7, 2015

Related U.S. Application Data

(60) Provisional application No. 62/148,909, filed on Apr. 17, 2015.

(51) Int. Cl.
*G06F 1/32* (2006.01)
*G06F 3/0484* (2013.01)

(52) U.S. Cl.
CPC .......... *G06F 1/3296* (2013.01); *G06F 1/3265* (2013.01); *G06F 3/0484* (2013.01)

(58) Field of Classification Search
CPC ...... G06F 1/163; G06F 1/3262; G06F 1/3265; G06F 1/3287; G06F 1/3296; G06F 3/0484
See application file for complete search history.

(56) References Cited

U.S. PATENT DOCUMENTS

| 6,429,840 B1 | 8/2002 | Sekiguchi |
| 6,563,899 B1 | 5/2003 | Matsumiya |
| 7,137,119 B1 | 11/2006 | Sankaranarayan et al. |
| 7,995,050 B2 * | 8/2011 | Wong ....................... G09G 3/20 345/204 |

(Continued)

FOREIGN PATENT DOCUMENTS

| EP | 1486939 A2 | 12/2004 |
| JP | 200066648 A | 3/2000 |
| WO | 02069313 A2 | 9/2002 |

OTHER PUBLICATIONS

Durgadoss-R, "A Bird's Eye View of Android System Services," Linux for You, OpenSourceForU.com, Retrieved from <http://www.opensourceforu.com/2013/12/birdseyeviewandroidsystemservices/> Dec. 11, 2013, 4 pp.

(Continued)

*Primary Examiner* — Dennis M Butler
(74) *Attorney, Agent, or Firm* — Shumaker & Sieffert, P.A.

(57) ABSTRACT

A computing device is described that executes a centralized service and a plurality of applications. The centralized service detects a change from a first power mode of the computing device to a second power mode of the computing device and responsive to detecting the change, determines a first application from the plurality of applications executing at the computing device, to notify of the change from the first power mode to a second power mode. The centralized service outputs to the first application an indication of the change from the first power mode to the second power mode, and responsive to receiving an indication response from the first application, suspends an application processor of the computing device.

20 Claims, 4 Drawing Sheets

(56) References Cited

U.S. PATENT DOCUMENTS

| | | | |
|---|---|---|---|
| 8,233,000 B1* | 7/2012 | Diard | G06F 1/3206 345/502 |
| 2007/0077033 A1 | 4/2007 | Shirai et al. | |
| 2008/0143695 A1 | 6/2008 | Juenemann et al. | |
| 2010/0235833 A1 | 9/2010 | Huang et al. | |
| 2014/0281607 A1 | 9/2014 | Tse | |
| 2016/0086568 A1* | 3/2016 | Imamura | G06F 1/163 345/643 |

OTHER PUBLICATIONS

Scotty Loveless, "Background App Refresh Explained in Layman's Terms," Scotty Loveless, Retrieved from <http://www.scottyloveless.com/blog/2014/background-app-refresh-explained> Mar. 25, 2014, 5 pp.

Apple, "Background Execution," iOS Developer Library, Retrieved from <https://developer.apple.com/library/ios/documentation/iPhone/Conceptual/iPhoneOSProgrammingGuide/BackgroundExecution/BackgroundExecution.html#//apple_ref/doc/uid/TP40007072-CH4-SW1> Sep. 17, 2014, 13 pp.

Android, "Location Strategies," Android Developers, Retrieved from the Internet on Apr. 13, 2015 <https://developer.android.com/guide/topics/location/strategies.html> 8 pp.

Android, "Power Management," Android Open Source Project, Retrieved from <http://www.kandroid.org/online-pdk/guide/power_management.html> Mar. 2015.

Android, "Services," Android Developers, Retrieved from the internet on Apr. 13, 2015 <https://developer.android.com/guide/components/services.html> 14 pp.

Apple, "Strategies for Implementing Specific App Features," Apple iOS Developer Library, Retrieved from <https://developer.apple.com/library/ios/documentation/iPhone/Conceptual/iPhoneOSProgrammingGuide/StrategiesforImplementingYourApp/StrategiesforImplementingYourApp.html#//apple_ref/doc/uid/TP40007072-CH5-SW1> Sep. 17, 2014.

* cited by examiner

UPDATING AND DISPLAYING INFORMATION IN DIFFERENT POWER MODES

This application claims the benefit of U.S. Provisional Application No. 62/148,909, filed Apr. 17, 2015, the entire content of which is hereby incorporated by reference.

BACKGROUND

Some mobile computing devices are referred to as "always-on" devices that continuously update and display information, even during seemingly long periods of non-use. For instance, a watch device is an example of an always-on device that may display a watch face graphical user interface, and other information, even if the watch does not detect user-provided input for hours at a time. To conserve energy, an always-on device may switch between different power modes to provide a user experience with visual complexity during periods of use and reduced energy consumption during periods of non-use.

To ensure that applications are providing content that is suited for a particular power mode, some always-on devices require applications to be tightly coupled to, and directly communicable with, the underlying hardware being used to present the content. Some always-on devices may even inhibit execution of certain applications during some power modes to ensure that the requirements of each power mode are met and the device maintains its appearance of always being on.

DETAILED DESCRIPTION

Figure 1:
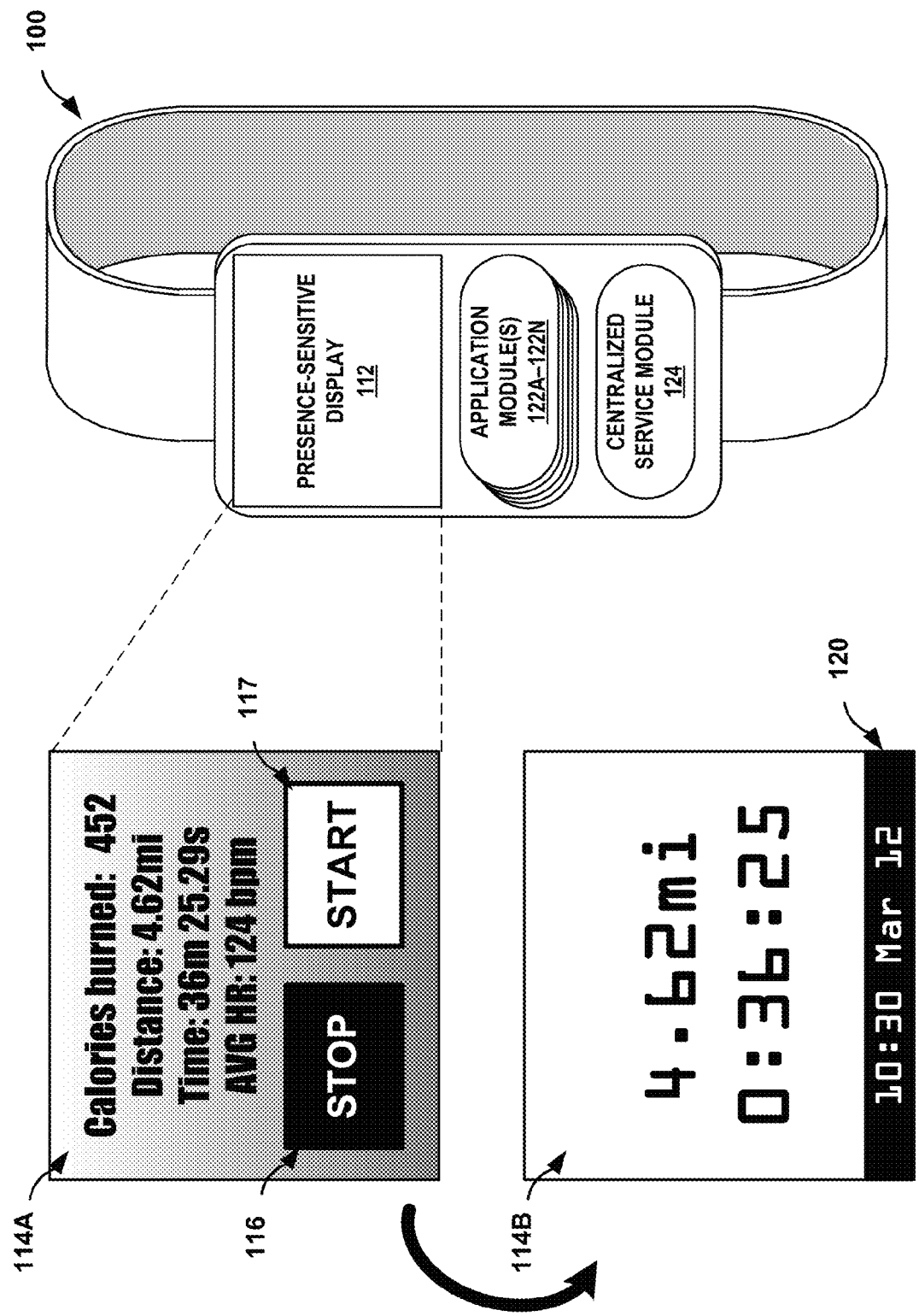
FIG. 1 is a conceptual diagram illustrating an example computing device configured to dynamically adapt graphical information in response to a change to a power mode, in accordance with one or more aspects of the present disclosure.

In general, techniques of this disclosure may enable an application executing at a computing device to dynamically change graphical information being displayed across different power modes of the computing device in compliance with the operating policies that the computing device maintains for each power mode. For example, an always-on computing device, such as a wearable computing device, may operate in multiple power modes. The computing device may operate in a full-power mode (also referred to herein as an "active mode") when the device infers that a user is more likely interacting with information being presented at a screen. In contrast, the computing device may operate in a low-power mode (also referred to herein as an "ambient mode") when the device determines that the user is more likely to be only periodically glancing at the information presented at the screen. In the active mode, because the user is more likely to be engaged in activity with the computing device, the computing device may require an application to follow a set of application operating policies for presenting richer, oftentimes more complex, content than the computing device otherwise requires the application to present while operating in ambient mode (e.g., when the user typically just glances at the information presented at the screen).

Rather than require the application to figure out when the computing device transitions from active to ambient mode (or vice versa), and to assist an application in updating graphical information in a way that complies with the requirements the computing device has in place for the various power modes, the application may register (e.g., at start-up or at run-time) with a centralized service executing in the background of the computing device. When the application registers with the centralized service, the centralized service lets the application know when a change in power mode has occurred. The centralized service signals the application when the computing device changes operating modes, provides the application with an opportunity to change the information being displayed before causing the computing device to go dormant (e.g., suspending application processors and/or display controllers to conserve battery power), and also coordinates whether the application has permission to change the information at the display.

For example, while the computing device operates in an active power mode, the centralized service may enable an application to cause an application processor of the computing device to output first graphical information for display including a full-color rendering of graphical and/or interactive content. At a later time, the application may receive an indication (i.e., data, a signal, etc.) from the centralized service indicating transition out of the active mode and into the ambient mode. While the computing device operates in the ambient mode, the application need not directly communicate with any low-level or underlying hardware to present graphical information in a format that is compatible with display properties of the second power mode. Instead, the application merely needs to recognize that the display controller of the computing device is in charge of re-drawing information at the display in a format that is compatible with the ambient mode.

In ambient mode, the application may momentarily have access to the application processor so as to output second graphical information (e.g., restricted graphical information such as monochromatic or less than full color static content) for display via the display controller. After outputting second graphical information for display via the display controller, the application may then inform the service that the application is finished using the application processor in response to the transition, and yield control of the application processor and the display controller back to the centralized service. In some examples, the service may supplement the updated graphical information by configuring the computing device to vibrate, play a sound, or provide some other indication to the user that the information at the display has been updated.

FIG. 1 is a conceptual diagram illustrating computing device 100 as an example computing device configured to dynamically adapt graphical information in response to a change to a power mode, in accordance with one or more aspects of the present disclosure. In the example of FIG. 1, computing device 100 is a wearable computing device (e.g., a computerized watch or so-called smart watch device). However, in other examples, computing device 100 may be a mobile phone, a tablet computer, a personal digital assistant (PDA), a laptop computer, a portable gaming device, a portable media player, an e-book reader, a television platform, an automobile computing platform or system, a fitness tracker, or any other type of mobile or non-mobile computing device that may be "always-on" and at least periodically updating and displaying information, even during seemingly long periods of non-use.

Computing device 100 may include presence-sensitive display 112. Presence-sensitive display 112 of computing device 100 may function as an input component for computing device 100 and as an output component. Presence-sensitive display 112 may be implemented using various technologies. For instance, presence-sensitive display 112 may function as a presence-sensitive input component using a presence-sensitive screen, such as a resistive touchscreen, a surface acoustic wave touchscreen, a capacitive touchscreen, a projective capacitance touchscreen, a pressure sensitive screen, an acoustic pulse recognition touchscreen, a camera and display system, or another presence-sensitive screen technology. Presence-sensitive display 112 may function as an output component, such as a display device, using any one or more of a liquid crystal display (LCD), dot matrix display, light emitting diode (LED) display, organic light-emitting diode (OLED) display, e-ink, or similar monochrome or color display capable of outputting visible information to the user of computing device 100.

Presence-sensitive display 112 of computing device 100 may include a presence-sensitive screen that can receive tactile user input from a user of computing device 100 and present output. Presence-sensitive display 112 may receive indications of the tactile user input by detecting one or more tap and/or non-tap gestures from a user of computing device 100 (e.g., the user touching or pointing at one or more locations of presence-sensitive display 112 with a finger or a stylus pen) and in response to the input, computing device 100 may cause presence-sensitive display 112 to present output. Presence-sensitive display 112 may present the output as part of a user interface (e.g., user interface screen shot 114A or user interface screen shot 114B) which may be related to functionality provided by computing device 100.

Computing device 100 may include one or more application modules 122A-122N (collectively referred to as "application modules 122") and centralized service module 124. Modules 122 and 124 may perform operations using software, hardware, firmware, or a mixture of hardware, software, and/or firmware residing in and executing on computing device 100. Computing device 100 may execute modules 122 and 124 with multiple processors. Computing device 100 may execute modules 122 and 124 as a virtual machine executing on underlying hardware. In some examples, presence-sensitive display 112 and modules 122 and 124 may be arranged remotely to, and remotely accessible from, computing device 100, for instance, as one or more network services via a network cloud.

Application modules 122 represent any application or activity that is executable at computing device 100 during multiple power modes. In some examples, application modules 122 may be built-in or system level applications executing at computing device 110. In some examples, application modules 122 are third-party applications (e.g., applications developed by third party developers and typically downloaded from an application repository accessible from a remote computing system and/or the Internet). Examples of application modules 122 may include a watch-stopwatch-timer application, an electronic message application, an Internet browser application, a fitness application, a navigation application, a map application, or any other type of application that can execute at an always-on device, such as computing device 110, during an active and ambient mode. Presence-sensitive display 112 may present various user interfaces of application modules 122, and a user of computing device 100 may interact with applications 122 to perform a function with computing device 100 through the respective user interface of each application. For the sake of brevity, application module 122A is used to describe the functions described herein although other application modules 122 may support similar functions as application module 122A.

Each of application modules 122 may cause computing device 100 to present information at presence-sensitive display 112 and interpret inputs detected at presence-sensitive display 112 or other input components in response to the presentation. For example, application module 122A may be a fitness tracker application that measures distance traveled, heart rate, calories burned, and other fitness information associated with a user of computing device 100. Application module 122A may display data (e.g., HTML-based display data, etc.) and provide instructions to presence-sensitive display 112 that cause presence-sensitive display 112 to display a rendered image of the display data as one of interface screen shots 114A or 114B. Application module 122A may cause presence-sensitive display 112 to output user interface screen shot 114A, user interface screen shot 114B, or another example user interface, for display and, as a user interacts with user interface presented at presence-sensitive display 112, application module 122A may interpret inputs detected at presence-sensitive display 112 (e.g., as a user provides one or more gestures at a location on a surface of presence-sensitive display 112 at which user interface screen shot 114A, user interface screen shot 114B, or another example user interface is displayed). Application module 122A may relay information about the inputs detected at presence-sensitive display 112 to one or more associated applications, operating systems, services, and/or computing platforms executing at computing device 100 associated with the user interface to cause computing device 100 to perform a function.

User interface screen shots 114A and 114B are two examples of a fitness tracker application's graphical user interface. User interface screen shots 114A and 114B each include graphical information or graphical indications (e.g., graphical elements, characters of text, etc.) of content displayed at various locations of presence-sensitive display 112. In the example of FIG. 1, although both user interface screen shots 114A and 114B include graphical information about a fitness session of a user, user interface screen shot 114A includes a greater amount of content and more complex presentation characteristics applied to the content than the content included in user interface screen shot 114B. User interface screen shot 114A represents graphical information or graphical content for display while computing device 100 operates in a full-power or active mode whereas user interface screen shot 114B represents graphical information or graphical content for display while computing device 100 operates in a low-power of ambient mode. When presenting a rendering of user interface screen shot 114A at presence-sensitive display 112, application module 122A may cause presence-sensitive display 112 to present user interface screen shot 114A with greater presentation characteristics (e.g., increased font size/smoothness, increased resolution, full color support, greater brightness, etc.) than the presentation characteristics that presence-sensitive display 112 applies to the presentation of user interface screen shot 114B. For example, user interface screen shot 114A includes text and user interaction buttons 116, 117 on a fading color background while user interface screen shot 114B may be a monochrome or limited-color display with or without visually-specified user interaction buttons 116, 117. In some examples, user interface screen shot 114B may still have a user input feature as will be described later. User interface screen shot 114A thus includes richer and more complex content than the content of user interface screen shot 114B.

Given the complexities of user interface screen shot 114A as compared to user interface screen shot 114B, presence-sensitive display 112 may require an application processor of computing device 100 to work in lock step with a display controller of computing device 100 to continuously update and draw the display of presence-sensitive display 112 when presence-sensitive display 112 displays user interface screen shot 114A. Conversely, being that user interface screen shot 114B is duller and less complex as compared to user interface screen shot 114A, presence-sensitive display 112 may enable an application processor and display controller to work separately to display user interface screen shot 114B. Presence-sensitive display 112 may require the application processor to only periodically update the display of presence-sensitive display 112 (e.g., as displayed information changes) and therefore enable the display controller of computing device 100 to re-draw presence-sensitive display 112 only as-necessary for maintaining user interface screen shot 114B at presence-sensitive display 112. By only periodically updating the display with the application processor, and requiring the display controller to drive presence-sensitive display 112 as is necessary for re-draw, computing device 100 may consume far less electrical power displaying user interface screen shot 114B as compared to the electrical power required to display user interface screen shot 114A by using the application processor and display controller together to continuously update and draw the display. As such, when computing device 100 operates in an ambient mode to support always-on functionality, computing device 100 may output a user interface such as user interface screen shot 114B as opposed to user interface screen shot 114A. User interface screen shot 114B is generated based on user interface screen shot 114A by culling information from interface screen shot 114A that is compatible for display in ambient mode and formatting it for presentation in ambient mode. For instance, application module 122A may obtain distance and time information included in interface screen shot 114A and format the information into a limited color or animation-free form for presentation as interface screen shot 114B.

Centralized service module 124 assists application modules 122 in complying with operating policies for updating graphical information across the various power modes of computing device 100. In particular, centralized service module 124 may enable third party applications, such as at least some of application modules 122, to comply with the requirements computing device 100 maintains for executing in ambient or low-power mode. Instead of having to be tightly coupled to the hardware of computing device 100 or be aware of all the details associated with executing in ambient or low-power mode, centralized service 124 may enable third party applications to have an abstracted view of ambient or low-power mode to easily comply with the low power operating state requirements of computing device 100. An application module 122 can register with centralized service module 124 and rely on centralized service module 124 to signal the application module 122 when the power mode changes and/or enters a power-saving mode.

As used herein, a "service" represents a module or application component configured to perform long-running operations in the background and does not provide a user interface. Other application components, such as application modules 122, can start a service and the service will continue to run in the background even if the user causes the computing device to switch focus to another application. Additionally, an application component can bind to a service to interact with the service and even perform inter-process communications (IPC). For example, a service might handle network transactions, play music, perform file I/O, or interact with a content provider, all while running in the background.

Centralized service module may enable application modules 122 to register (e.g., at start-up or at run-time) with centralized service module 124 as centralized service module 124 executes in the background of computing device 100. When application modules 122 register with centralized service module 124, centralized service module 124 may signal to application modules 122 when computing device 100 changes operating modes. In addition, centralized service module 124 may also coordinate whether any of application modules 122 has permission to update graphical information presented at presence-sensitive display 112. In some examples, centralized service module 124 may assist other services executing at computing device 100 to determine whether to force computing device 100 into or out of an ambient mode.

Computing device 100 may operate in multiple power modes. For example, computing device 100 may operate in active mode in which computing device 100 causes presence-sensitive display 112 to display an application user interface or notification in full-screen (e.g., utilizing many pixels), having an increased screen brightness, and with the application processor running. Active mode generally draws a lot of power due in part to the fact that the application processor and display controller of computing device 100 continuously work together to update and draw information presented at presence-sensitive display 112. Conversely, computing device 100 may operate in ambient mode in which computing device 100 causes presence-sensitive display 112 to display a monochrome or limited color watch face with a textual time and date notification 120 peeking from one side (e.g., the bottom of the screen) and where the screen brightness is low. During the ambient mode, the computing device keeps the application processor asleep and not running as much as possible and preferably, the vast majority of the time. Accordingly, compared to active mode, ambient mode draws very little power due in part to the fact that the application processor may only wake in order to update the information before the information is drawn by the display controller at presence-sensitive display 112. Although two power modes are described, this disclosure can be extended to three or more power modes, each with its own rules regarding display component power usage, application processor power usage, and other parameters.

In some examples, in active mode, the display controller may function similar to display controllers of other devices by continuously drawing presence-sensitive display based on information in a memory (e.g., which is capable of storing one screen image of information) of the display controller that is continuously being updated by the application processor. In ambient mode however, the display controller may function differently than typical display controllers. The display controller may determine when the application processor is suspended because before the application processor is suspended, the application processor (via application modules 122) may communicate to the display controller that the display controller is to periodically re-draw the last screen image provided in the memory (i.e., the last screen image loaded into the local frame buffer memory on the display controller) until the application processor re-wakes and communicates to the display controller that the display controller is to draw a different image that has subsequently been loaded into the memory.

In accordance with techniques of this disclosure, computing device 100 may refrain from outputting watch information 120 at presence-sensitive display 112 while operating in ambient mode. Instead, an application, such as application module 122, may control the entire screen of presence-sensitive display 112 while the computing device 100 is in the low-power, ambient mode.

While computing device 100 operates in a first power mode, application module 122A may cause presence-sensitive display 112 to output, for display, first graphical information. For example, application module 122A may configure presence-sensitive display 112 to output user interface screen shot 114A as part of a fitness application during the active mode of computing device 100.

Application module 122A may register with centralized service module 124. Whenever computing device 100 transitions to active mode, centralized service module 124 may notify each of the application modules 122 that are registered with centralized service module 124 of the change in power mode of computing device 100. Application module 122A may receive, from centralized service module 122, an indication of a change from the first power mode to a second power mode of the computing device. For example, application module 122A may receive data via an IPC protocol indicating that computing device 100 has transitioned from active mode to ambient mode.

While computing device 100 operates in the second power mode, application module 122A may generate, based on the first graphical information, second graphical information that is compatible with display properties of the second power mode. For example, in response to receiving the indication of the change in power mode of computing device 100, application module 122A may update the graphical information presented by presence-sensitive display 112 to comply with the operating requirements of the ambient mode.

For instance, while in an ambient mode, application module 122A may want to update presence-sensitive display 112 periodically (e.g., less frequently than an update rate of presence-sensitive display 112) or even sporadically in order to show new information to a user (e.g., an updated navigation instruction or perhaps how many steps a device has measured during a user's run). Working with centralized service module 124, application module 122A can process data collected by sensors of computing device 100 while the application processor was asleep, and based on the sensor information, cause presence-sensitive display 112 to update the screen. After finishing updating the information for presentation at presence-sensitive display 112, application module 122A and centralized service module 124 may enable the application processor to go back to sleep during the ambient mode. Said differently, while computing device 100 operates in active mode, application module 122A may send graphical information to an application processor of computing device 100 for continuously updating a memory of a display controller of computing device 100 for drawing a presence-sensitive display 112 and while computing device 100 operates in ambient mode, application module 122A may send updated graphical information to the application processor for periodically updating the memory of the display controller for drawing presence-sensitive display 112.

In some examples, application module 122A may receive, from centralized service module 124, display policies (e.g., a quantity of colors supported by the second mode, a transition animation supported by the second mode, etc.) associated with the second mode. Application module 122A may generate the second graphical information based on the display policies received from centralized service module 124.

After generating user interface screen shot 114B as an ambient mode compliant version of user interface screen shot 114A, application module 122A may output, for display, the second graphical information. For example, application module 122A may call on centralized service module 124 to update presence-sensitive display 112 by sending the second graphical information to centralized service module 124 and having the centralized service module 124 instruct the display controller of presence-sensitive display 112 to draw the screen. In some examples, application module 122A may control the display controller of presence-sensitive display 112 directly to cause presence-sensitive display 112 to draw user interface screen shot 114A as user interface screen shot 114B and then the application module 122A goes to sleep in conformance with ambient mode operating policies. Periodically, application module 122A may be woken up by centralized service module 124 to update and draw graphical user interface screen shot 114B (e.g., to increment the distance traveled and/or other information based on sensor data collected by computing device 100).

In some examples, computing device 100 may enter ambient mode based at least in part on whether computing device 100 is currently charging. Application modules 122 executing at computing device 100 need not be aware of how or why computing device 100 enters or does not enter ambient mode. Instead, application module 122A can simply rely on a signal from centralized service module 124 that indicates whether computing device 100 has changed power modes to determine whether to alter the graphical information presented at presence-sensitive display 112. In this way, application modules 122 can comply with operating policies of ambient mode without being tightly coupled to hardware or details of how and why computing device 100 enters and exits the different modes.

Because some computing devices, such as computing device 100, may have many application modules 122 that can provide ambient mode and active mode graphical information, some of application modules 122 may support ambient mode and some may not. In some examples, if one of application modules 122 does not support an ambient mode, centralized service module 124 may configure presence-sensitive display 112 to display a default user interface (e.g., watch face or time-and-date information).

Computing device 100 does not require application modules 122 to be tightly coupled to, and directly communicable with, the underlying hardware being used to present graphical content in order to comply with the operating policies of the various power modes. Additionally, computing device 100 need not inhibit execution of certain applications during some power modes as a way to ensure that the operating requirements of each power mode are met and the device maintains its appearance of always being on. Instead, computing device 100 relies on centralized service module 124, and the capability centralized service module 124 provides to application modules 122, to enable application modules 122 (e.g., third party developers of applications for computing device 100 that are not built-in to the operating platform, or operating system, and can be downloaded from an application repository and installed to execute in an application layer of computing device 100) to determine when computing device 100 is in an interactive, ambient, and off mode (e.g., a mode in which presence-sensitive display 112 refrains from presenting information) to comply with the operating policies of device 100.

Figure 2:
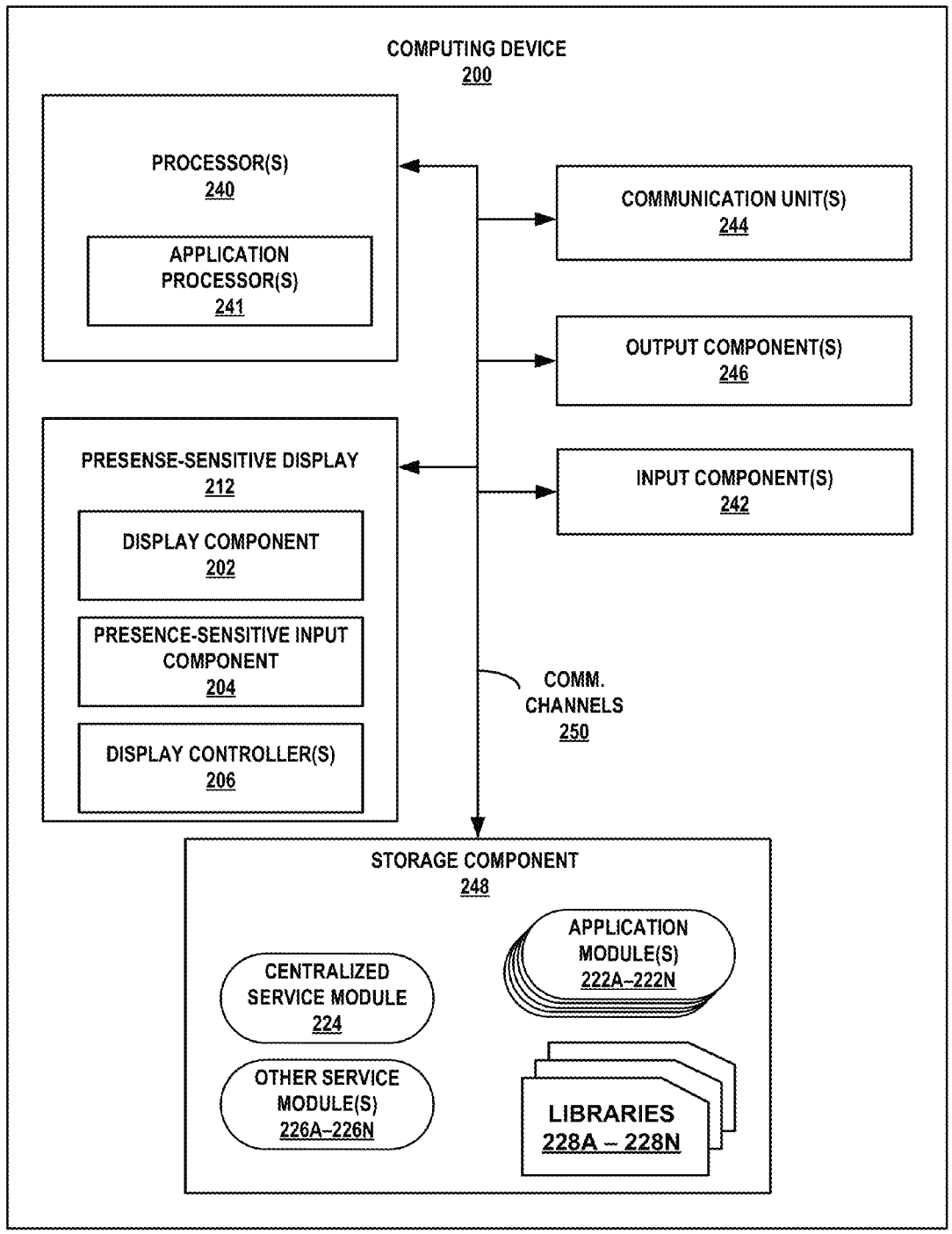
FIG. 2 is a block diagram illustrating an example computing device configured to dynamically adapt graphical information in response to a change to a power mode, in accordance with one or more aspects of the present disclosure.

FIG. 2 is a block diagram illustrating computing device 200 as an example computing device configured to dynamically adapt graphical information in response to a change to a power mode, in accordance with one or more aspects of the present disclosure. FIG. 2 illustrates only one particular example of computing device 200 and many other examples of computing device 200 may be used in other instances. In the example of FIG. 2, computing device 200 may be a wearable computing device, a mobile computing device, or a non-portable (e.g., desktop, etc.) computing device; however, computing device 200 is described below under the premise that computing device 200 is configurable as an always-on device. Computing device 200 of FIG. 2 may include a subset of the components included in example computing device 100 of FIG. 1 and may include additional components not shown in FIG. 2. In some examples, computing device 200 is a watch device.

As shown in the example of FIG. 2, computing device 200 includes presence-sensitive display 212, one or more processors 240, one or more input components 242, one or more communication units 244, one or more output components 246, and one or more storage components 248. Processors 240 include one or more application processors 241 and presence-sensitive display 212 includes display component 202, presence-sensitive input component 204, and one or more display controllers 206. One or more storage components 248 of computing device 200 also include application modules 222 and centralized service module 224. Additionally, storage components 248 include other service modules 226A-226N and libraries 228A-228N.

Communication channels 250 may interconnect each of the components 202, 204, 212, 206, 220, 222, 230, 232, 240, 241, 242, 244, 246, and 248 for inter-component communications (physically, communicatively, and/or operatively). In some examples, communication channels 250 may include a system bus, a network connection, an inter-process communication data structure, or any other method for communicating data.

One or more input components 242 of computing device 200 may receive input. Examples of input are tactile, audio, and video input. Input components 242 of computing device 200, in one example, includes a presence-sensitive display, touch-sensitive screen, mouse, keyboard, voice responsive system, video camera, microphone or any other type of device for detecting input from a human or machine.

One or more output components 246 of computing device 200 may generate output. Examples of output are tactile, audio, and video output. Output components 246 of computing device 200, in one example, includes a presence-sensitive display, sound card, video graphics adapter card, speaker, cathode ray tube (CRT) monitor, liquid crystal display (LCD), or any other type of device for generating output to a human or machine.

One or more communication units 244 of computing device 200 may communicate with external devices via one or more wired and/or wireless networks by transmitting and/or receiving network signals on the one or more networks. Examples of communication unit 244 include a network interface card (e.g. such as an Ethernet card), an optical transceiver, a radio frequency transceiver, a GPS receiver, or any other type of device that can send and/or receive information. Other examples of communication units 244 may include short wave radios, cellular data radios, wireless network radios, as well as universal serial bus (USB) controllers.

Presence-sensitive display 212 of computing device 200 includes display component 202 and presence-sensitive input component 204. Display component 202 may be a screen at which information is displayed by presence-sensitive display 212 and presence-sensitive input component 204 may detect an object at and/or near display component 202. As one example range, presence-sensitive input component 204 may detect an object, such as a finger or stylus that is within two inches or less of display component 202. Presence-sensitive input component 204 may determine a location (e.g., an (x,y) coordinate) of display component 202 at which the object was detected. In another example range, presence-sensitive input component 204 may detect an object six inches or less from display component 202 and other ranges are also possible. Presence-sensitive input component 204 may determine the location of display component 202 selected by a user's finger using capacitive, inductive, and/or optical recognition techniques. In some examples, presence sensitive input component 204 also provides output to a user using tactile, audio, or video stimuli as described with respect to display component 202. In the example of FIG. 2, presence-sensitive display 212 presents a user interface (such as user interface screen shots 114A and 114B of FIG. 1).

While illustrated as an internal component of computing device 200, presence-sensitive display 212 may also represent and external component that shares a data path with computing device 200 for transmitting and/or receiving input and output. For instance, in one example, presence-sensitive display 212 represents a built-in component of computing device 200 located within and physically connected to the external packaging of computing device 200 (e.g., a screen on a mobile phone). In another example, presence-sensitive display 212 represents an external component of computing device 200 located outside and physically separated from the packaging of computing device 200 (e.g., a monitor, a projector, etc. that shares a wired and/or wireless data path with a tablet computer).

Presence-sensitive display 212 is configured to present full-color graphical content while computing device 200 operates in active mode. Presence-sensitive display 212 is further configured to present less than full-color content while computing device 200 operates in ambient mode.

Presence-sensitive display 212 may further include one or more display controllers 206 that may be responsible for managing the execution of the underlying hardware and embedded software and/or drivers associated with presence-sensitive display 212. Said another way, display controllers may implement functionality and/or execute instructions within computing device 200 that specifically geared to the form, fit, and functionality of presence-sensitive display 212. In some examples, display controllers 206 are separate components of computing device 200 that are operably coupled to presence-sensitive display 212. In ambient mode, application modules 222-226 may call on display controllers 206 to draw or re-draw graphical content presented at presence-sensitive display 212. In this way, application processors 241 can remain dormant as much as possible while continuing to provide updated information at presence-sensitive display 212.

In some examples, display controllers 206 are specialized processors that consume much less electrical power in operation, as compared to processors 240. In some examples, modules 222-226 may call on display controller 206 to draw and/or re-draw graphical content for display at presence-sensitive display 212 rather than continuously call on processors 240 to first update the graphical content as a way to save power. For example, application module 222A may receive information indicating that computing device 210 is operating in an ambient power mode or low-power mode. Application module 222A may initially output graphical content to application processors 241 for display at presence-sensitive display 212. However rather than continuously call on application processors 241 to drive display 212, when the graphical content is not changing, application module 222A may instruct display controller 206 to simply re-draw the graphical content being displayed at presence-sensitive display 212. In this way, application module 222A uses less power to maintain a user interface at a display than would otherwise be consumed if application processor 241 were used continuously to update and draw presence-sensitive display 212.

One or more processors 240 may implement functionality and/or execute instructions within computing device 200. For example, processors 240 on computing device 200 may receive and execute instructions stored by storage components 248 that execute the functionality of modules 222-226. These instructions executed by processors 40 may cause computing device 200 to store information within storage components 248 during program execution. Processors 40 may execute instructions of modules 222-226 to cause presence-sensitive display 212 to render portions of content of display data as one of user interface screen shots 114A and 114B at presence-sensitive display 212. That is, modules 222-226 may be operable by processors 240 to perform various actions or functions of computing device 200, for instance, causing presence-sensitive display 212 to present user interface screen shots 114A and 114B at presence-sensitive display 212.

Application processors 241 generally represent any computation intensive and power hungry processor configured primarily for executing application modules 222. That is, when it comes to causing presence-sensitive display 212 to present rich, complex content associated with application modules 222, and or to execute the functionality of application modules 222, application processors 241 provide sufficient computation power to execute the functions of applications 222 to meet the requirements of computing device 200. Computing device 200 generally relies on application processors 241 to execute application modules 222. In addition, application processors are used by computing device 200 to drive or otherwise control presence-sensitive display 212, during full-power or active mode. In active mode, application modules 222-226 may call on application processors 241 to continuously update the graphical content presented at presence-sensitive display 212. In this way, the additional power drawn by application processors 241 for controlling presence-sensitive display 212 is offset in active mode by the richer, more complex (e.g., often animated) content displayed at presence-sensitive display 212 as compared to ambient mode.

One or more storage components 248 within computing device 200 may store information for processing during operation of computing device 200 (e.g., computing device 200 may store data accessed by modules 222-226 during execution at computing device 200). In some examples, storage component 248 is a temporary memory, meaning that a primary purpose of storage component 248 is not long-term storage. Storage components 248 on computing device 200 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 may be configured to store larger amounts of information than volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220 and 222, and display data 230 and presentation properties 232.

Libraries 228A-228N (collectively "libraries 228") are repositories of source code and/or resources relied upon by application modules 222 to perform functions. For example, application module 222A may access one of libraries 228 while calling upon presence-sensitive display 212 and/or centralized service 224 as application module 222A provides graphical content for display using application processors 241 or display controller 206. Application module 222A may utilize an application programming interface (API) to call one or more functions for performing operations described herein. In some examples, libraries 228 include code and/or resources for enabling computing device 200 to enable an application to dynamically adapt graphical information for presentation in different power modes without having to manage the complex display and power consumption policies that may be associated with each power mode. Said differently, libraries 228 may include the source code and functions that are accessible by modules 222-226 to perform the techniques described herein for configuring presence-sensitive display 212 to display graphical information that is suited to the current power mode of computing device 200.

Centralized service module 224 may be operable by application processors 241 to detect a change from a first power mode of computing device 200 to a second power mode of computing device 200 (e.g., a change from active mode to ambient mode or vice versa). Responsive to detecting the change, centralized service module 224 may be operable by application processors 224 to output, to one or more of application modules 222, an indication of the change from the first power mode to a second power mode. For instance, centralized service module 224 may share data with application modules 222 indicating the change. Responsive to receiving an indication that the one or more application modules 222 are finished outputting graphical information using application processors 224 and/or display controller 206, in response to the change from the first power mode to the second power mode, centralized service module 224 may be operable by application processors 224 to suspend the control by the one or more application modules 222 control display controller 206. In other words, after receiving an indication from the one or more application modules 222 of completion of updating and drawing the information presented at presence-sensitive display 212, centralized service module 224 may disable application processors 224 to save power by rendering control by one or more application modules 222 over to display controller 206.

Application module 222A may be operable by application processors 241 to responsive to receiving the indication of the change from centralized service module 224, momentarily wake application processors 224 to update the graphical information being drawn by display controller 206 at presence-sensitive display 212, while computing device 200 operates in the second power mode. For example, application module 222A may configure presence-sensitive display 212 to present user interface screen shot 114B instead of user interface screen shot 114A after receiving the indication of the change. Application module 222A may be operable by application processors 241 to output the indication that application module 222A is finished outputting the graphical information using application processors 241 and display controller 206 (e.g., to relinquish control of display controller 206 back to centralized service module 224 and/or other application modules 222).

In some examples, application module 222A is further operable by application processors 241 to: output, to application processors 241, first graphical information for display at presence-sensitive display 212 while the computing device operates in the first power mode, and generate, based on the first graphical information, the second graphical information that is compatible with display properties of the display while the computing device operates in the second power mode. In other words, to provide continuity between power modes, application module 222A may generate user interface screen shot 114B for display in ambient mode based on the information contained in user interface screen shot 114A which is being displayed before the transition to ambient mode.

Figure 3:
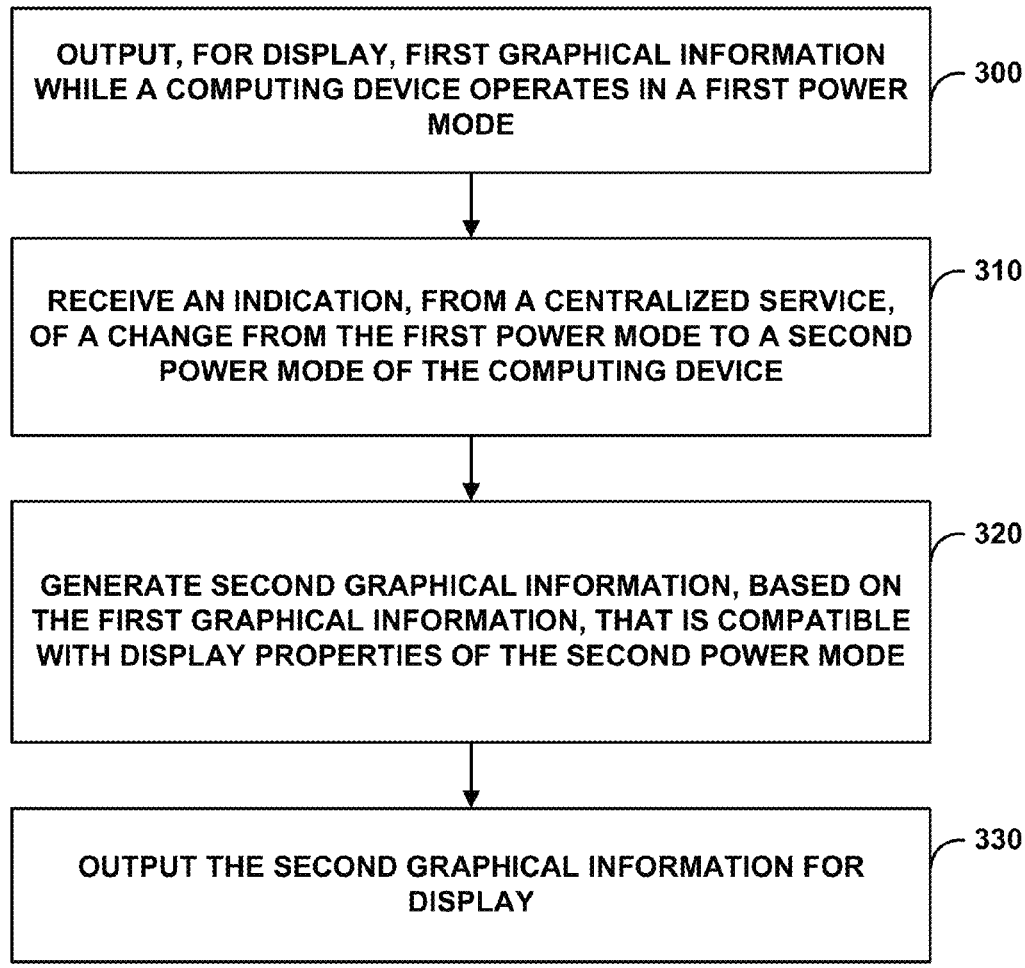
FIG. 3 is a flowchart illustrating example operations of an application executing at an example computing device that is configured to dynamically modify content in response to a change to a power mode, in accordance with one or more aspects of the present disclosure.

FIG. 3 is a flowchart illustrating example operations of application modules 122A and 222A, executing at a computing device, such as computing devices 100 and 200, that are configured to dynamically modify content in response to a change to a power mode, in accordance with one or more aspects of the present disclosure. FIG. 3 is described primarily within the context of computing device 200 of FIG. 2, however, it should be understood that the operations described in regards to FIG. 3 may also be performed by computing device 100 of FIG. 1.

In operation, application module 222A may output, for display, first graphical information while computing device 200 operates in a first power mode (300). For example, application module 222A may configure application processor 241 to continuously update and cause display controllers 206 to draw presence-sensitive display 212 to present a user interface, such as user interface screen shot 114A.

In some examples, the first graphical information may be output for display by application module 222A in a foreground of a first graphical user interface of computing device 200 while computing device operates 200 in the first power mode. In other words, application module 222A may cause presence-sensitive display 212 to output graphical user interface screen shot 114A in-front and/or centered at a screen of presence-sensitive display 212 when computing device 200 operates in active mode, just prior to computing device 200's transition to ambient mode.

Application module 222A may receive an indication, from centralized service module 224, of a change from the first power mode to a second power mode of computing device 200 (310). For example, in response to receiving data from centralized service module 224 of the transition by computing device 200 from an active mode to an ambient mode, application module 222A may begin updating the information presence-sensitive display 212 presents to comply with the operating requirements of the ambient mode.

That is, while computing device 200 operates in the second power mode, application module 222A may generate, based on the first graphical information, second graphical information that is compatible with display properties of the second power mode. For instance, application module 222A may briefly utilize application processors 241 to determine updated distance or fitness information related to a user's run. Application module 222A may generate renderable content that conveys the updated information to a user.

Additionally, while computing device 200 operates in the second power mode, application module 222A may output the second graphical information for display (330). For example, application module 222A may use application processors 241 to update presence-sensitive display 212 and call on display controllers 206 to draw the graphical information presented at presence-sensitive display 212 to include the updated information (e.g., as user interface screen shot 114B).

In some examples, the second graphical information may be output for display in a foreground of a second graphical user interface of the computing device while the computing device operates in the second power mode. In other words, application module 222A may cause presence-sensitive display 212 to output graphical user interface screen shot 114B in-front and centered at a screen of presence-sensitive display 212 when computing device 200 operates in ambient mode, to preserve continuity with the types of information computing device 200 was presenting just prior to computing device 200's transition to ambient mode.

In some examples, application module 222A may receive the indication of the change from the first power mode to the second power mode after outputting, to centralize service module 224, an indication that application module 222A supports the second mode of computing device 200. In other words, application module 222A may register with centralized service module 224 pre-execution and by registering, be notified by centralized service module 224 when computing device 200 changes operating states.

In some examples, centralized service module 224 may answer library calls from functions stored at libraries 228 that application module 222A accesses to utilize the appropriate display driver. For example, application module 222A may call a display function from libraries 228 to configure presence-sensitive display 212 to present user interface screen shot 114B. To application module 222A, the display function takes care of drawing presence-sensitive display 212 using the appropriate order of operations associated with application processors 241 or display controller 206. Behind the scenes, centralized service module 224 answers the display function call and causes the correct operations associated with application processors 241 and/or display controller 206 to be performed for drawing the graphical content presented at presence-sensitive display 212. In the case of active mode, centralized service module 224 uses application processors 241 to continuously update the graphical content presented at presence-sensitive display 212 and uses display controller 206 to draw graphical content presented at presence-sensitive display 212. In the case of ambient mode, centralized service module 224 only periodically calls on application processors 241 to update the graphical content while utilizing display controller 206 to re-draw graphical content presented at presence-sensitive display 212 between the periodic calls to application processors 241.

In some examples, application module 222A may execute at application processors 241 regardless of whether computing device 200 is executing in the first or second power modes. In other words, application processors 241 execute instructions for performing operations associated with each of application modules 222, but application modules 222 may configure display controller 206 to, depending on the power mode, draw with an update or re-draw presence-sensitive display 212 without an update from application processors 241.

In some examples, after application module 222A outputs the second graphical information for display, application module 222A may output, to centralized service module 224, an indication that application module 222A is finished executing at the application processor 241 in response to the change from the first power mode to the second power mode. And in some examples, after application module 222A outputs the second graphical information for display, application module 222A may output, to centralized service module 224, an indication that application module 222A is finished calling on display controller 206 in response to the change from the first power mode to the second power mode. Said differently, centralized service module 224 may relinquish some control over computing device 200 to application module 222A while computing device 200 operates in ambient mode. Barring a time-out (e.g., if application module 222A holds control for too long), centralized service module 224 may refrain from giving control to other components of computing device 200 until centralized service module 224 receives an indication that application module 222A is finished executing and/or updating information displayed at presence-sensitive display 212.

Figure 4:
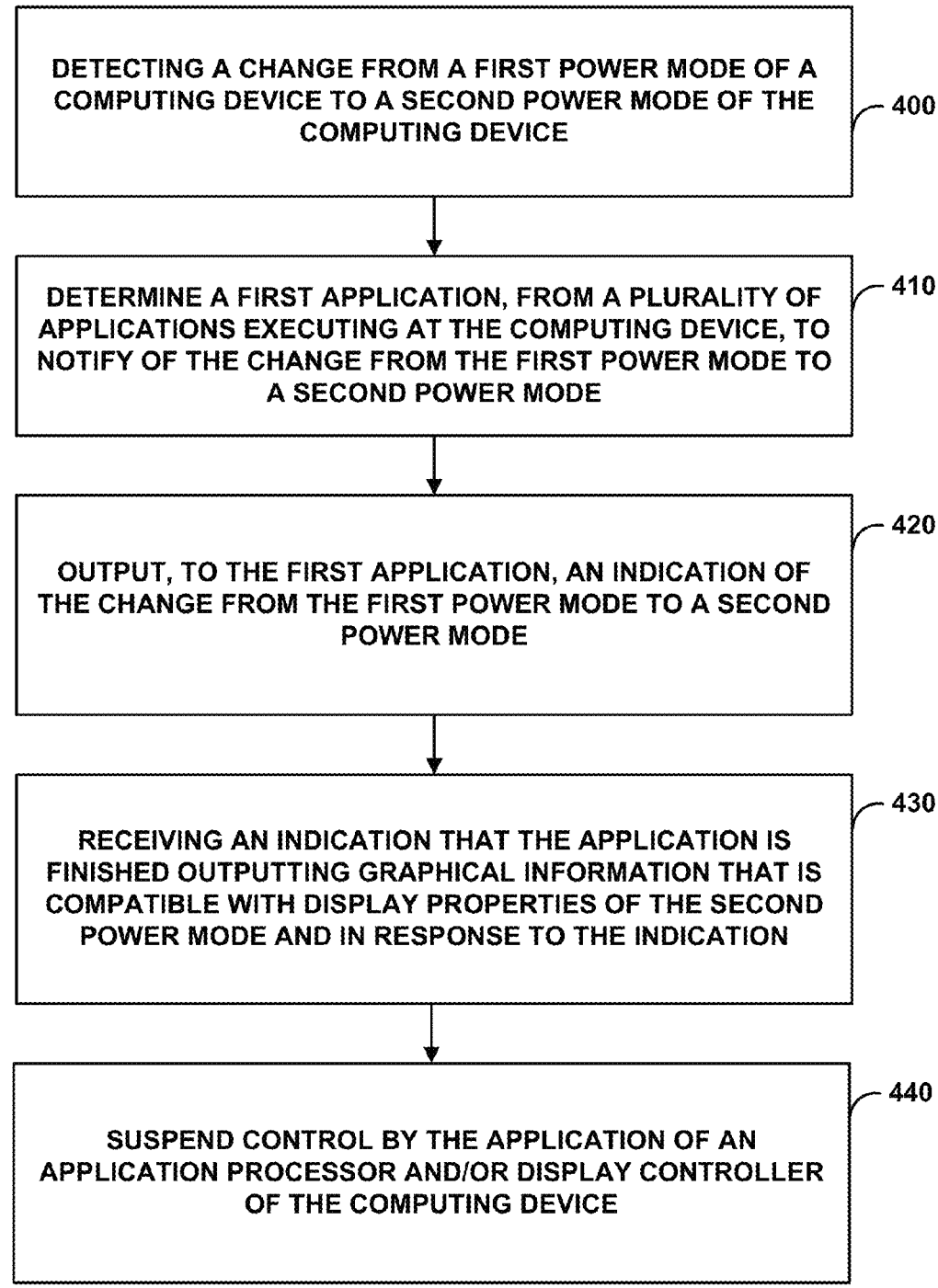
FIG. 4 is a flowchart illustrating example operations of an example service executing at an example computing device that is configured to dynamically modify content in response to a change to a power mode, in accordance with one or more aspects of the present disclosure.

FIG. 4 is a flowchart illustrating example operations of an example service executing at an example computing device that is configured to dynamically modify content in response to a change to a power mode, in accordance with one or more aspects of the present disclosure. FIG. 4 is described primarily within the context of computing device 200 of FIG. 2, however, it should be understood that the operations described in regards to FIG. 4 may also be performed by computing device 100 of FIG. 1.

Rather than require the application to figure out when the computing device transitions from active to ambient mode (or vice versa), and to assist an application in updating graphical information in a way that complies with the requirements the computing device has in place for the various power modes, an application may register (e.g., at start-up or at run-time) with a centralized service, such as centralized service module 224, executing in the background of the computing device. When the application registers with the centralized service, the centralized service lets the application know when a change in power mode has occurred. The centralized service signals the application when the computing device changes operating modes, provides the application with an opportunity to update information before causing the computing device to go dormant (e.g., suspending application processors and/or display controllers to conserve battery power), and also coordinates whether the application has permission to update the display.

In operation, centralized service module 224 may detect a change from a first power mode of computing device 200 to a second power mode of computing device 200 (400). For example, centralized service module 224 and/or one or more of modules 226 may manage one or more timers or analyze user inputs to determine when to cause computing device 200 to transition from a full-power active mode to a low-power ambient mode. For instance, centralized service module 224 may determine that a user provided an explicit input at presence-sensitive display 212 (e.g., palming or otherwise covering up the screen with his or her hand) to cause computing device 200 to enter ambient mode. In some examples, if centralized service module 24 deems that sufficient time has elapsed without user input, that computing device 200 is to enter ambient mode.

In any case, centralized service module 224 may detect a change from active mode to ambient mode and response to the change, centralized service module 224 may determine a first application, from a plurality of applications executing at the computing device 200, to notify of the change from the first power mode to a second power mode (410). In other words, centralized service module 224 may determine an initial application from application modules 222 to notify of the change from active mode to ambient mode.

In some examples, centralized service module 224 may determine the first application to notify of the change in response to receiving an indication, from the first application, that the first application supports the second mode of the computing device. For instance, as application module 222A may have registered with centralized service module 224, centralized service module 224 may be aware that application module 222A supports displaying information in ambient mode.

In some examples, centralized service module 224 may determine the first application to notify of the change in response to determining the first application was outputting graphical information in a foreground of a graphical user interface of the computing device prior to detecting the change. Said differently, centralized service module 224 may notify the one of application modules 222 that was presenting graphical content for display in active mode just before the transition to ambient mode, or vice versa. In this way, to a user, computing device 200 may provide a seamless transition between displaying useful and updated information in multiple power modes.

Centralized service module 224 may output to the first application, an indication of the change from the first power mode to a second power mode (420). For example, in response to determining application module 222A is the first application to notify of the change, centralized service module 224 may signal to application module 222A to wake up and handle updating the information presented at presence-sensitive display 212 to be compatible with the operating requirements of ambient mode.

In some examples, after outputting the indication of the change from the first power mode to the second power mode, centralized service module 224 may receive, from the first application, a request to manipulate a display property of a display of the computing device, determine, a display permission associated with the first application, and responsive to determining the display permission satisfies the request, modify, based on the request, the display property of the display. In other words, centralized service module 224 may ensure that computing device 200 can effectively mediate requests made by multiple application modules 222 to update and draw information presented at presence-sensitive display 212. Unlike other systems that reserve updating and drawing a display for use by system components only, centralized service module 224 enables application modules 222 to update and re-draw presence-sensitive display 212 while in ambient mode while ensuring application modules 222 correctly manipulate the display state or brightness.

Centralized service module 224 may receive an indication response that the first application is finished outputting graphical information that is compatible with display properties of the second power mode and in response to the indication (430). In other words, centralized service module 224 may wait to hear back from application module 222A that application module 222A is finished updating presence-sensitive display 212 in compliance with operating requirements of the ambient mode.

In response to receiving data indication application module 222A is finished with the update of presence-sensitive display 212, centralized service module 224 may suspend control by the first application of application processor 241 and/or display controller 206 of computing device 200 (440). In other words, to conserve battery power and minimize power consumption while in ambient mode, centralized service module 224 may cause application processors 241 and/or display controller 206 to go dormant until a subsequent update and draw, or re-draw without update, of presence-sensitive display 212.

In some examples, responsive to receiving the indication that the first application is finished executing in response to the change from the first power mode to the second power mode, centralized service module 224 may determine a second application module, from the plurality of application modules 222 executing at computing device 200, to notify of the change. In other words, centralized service module 224 may repeat operations 410-440 for a second application registered with centralized service module 224 that needs access to application processors 241, display controllers 206, and/or presence-sensitive display 212 during ambient mode. In this way, centralized service module 224 may handle waking and communicating with multiple application modules 222 that execute in ambient mode and resolve conflicts between them (e.g., two application modules 222 simultaneously configuring display controller 206 to update a graphical image displayed at presence-sensitive display 212). For example, centralized service module 224 may give a single application module 222 access to application processor 241 and/or display controller 206, at a time.

In some examples, responsive to receiving an indication that the application is finished executing in response to the change from the first power mode to the second power mode, centralized service module 224 may suspend the application's control over application processors 241 of computing device 200. In other words, to conserve battery power and minimize power consumption while in ambient mode, centralized service module 224 may cause application modules 241 to go dormant as much as possible while computing device 200 operates in ambient mode. When centralized service module 224 learns that application module 222A is finished using application processors 241 for updating presence-sensitive display 212, and after determining no further application modules 222 need notifying of the change to ambient mode, centralized service module 224 may cause application processors 241 to go dormant until a subsequent update of presence-sensitive display 212.

In some examples, responsive to determining that a threshold amount of time since application module 222A output the graphical information, 206, centralized service module 224 may update the graphical information (e.g., move the information slightly off-centered) and output, to display controller 206, a command to draw the updated graphical information to prevent burn-in. For example, a drawback of always-on devices such as computing device 200, is that some screen technology is susceptible to burn-in. Rather than cause application modules 222 to manage burn-in prevention, centralized service module 224 may periodically cause display controller 206 to slightly shift one or more pixels of presence-sensitive display 212 in any direction to prevent burn-in during ambient mode.

In accordance with techniques of this disclosure, a centralized service executing in the background of a computing device may enable an application module to specify that it supports an ambient mode at runtime or through its manifest. In addition, the centralized service may inform the application module when a transition to an ambient or interactive mode is occurring while it is running in the foreground. While in the ambient mode, in addition, the centralized service may enable the application module to inform the system when it is safe to suspend the application processor. This may be accomplished implicitly simply by returning from an ambient mode callback with the assumption that the application module is responsible for holding a wake lock from that point forward if it needs to prevent the application processor from suspending. In addition, the centralized service may, while in the ambient mode, enable the application module to inform the system when the application module is finished communicating with the display controller. This may be accomplished by some kind of request to draw/finished drawing mechanism. In addition, the centralized service may ensure that the system can effectively mediate requests made by application modules that support ambient mode. In addition, the centralized service may provide information to the application module about the desired UI rendering mode while in an ambient mode (e.g., onebit monochrome, 3 bit color, etc.). In addition, the centralized service may enable the application module to animate its content when transitioning into and out of ambient mode. Furthermore, the centralized service may support display burn-in prevention transparently in the system (without API impact) or knowledge of ambient application modules.

In accordance with techniques of this disclosure, as a user goes out for a run while wearing a computing device, such as computing device 200, and looks down at a screen such as presence-sensitive display 212, the user may see his or her heart rate, distance covered, current pace, and time running, even though computing device 200 may be operating in ambient mode. The centralized service enables the fitness application running in the background to draw the display while in ambient mode. The information drawn by the fitness application is seemingly always visible at a glance and the user need not wake (e.g., by touching) the device to bring it out of ambient mode and into active mode to see the information that is critical to the activity.

In accordance with techniques of this disclosure, as a user interacts with a computing device, such as computing device 200, the user may provide input at computing device 200 to obtain navigation directions while walking to a new restaurant. The computing device may output a vibration at every turn and provide a full screen view including information with distance count down, street name, direction, and the like as the user navigates to the restaurant. Even though walking to the restaurant may take thirty minutes or more, providing this information in ambient mode according to the described techniques may hardly impacts the battery usage of the device in a noticeable way. In addition, the device may enable the user to obtain more information simply by tapping on the screen to turn on color and place the device back into active mode.

Clause 1. A method comprising: while a computing device operates in a first power mode, outputting, by an application executing at the computing device, for display, first graphical information; receiving, by the application, from a centralized service executing at the computing device, an indication of a change from the first power mode to a second power mode of the computing device; and while the computing device operates in the second power mode: generating, by the application, based on the first graphical information, second graphical information that is compatible with display properties of the second power mode; and outputting, by the application, for display, the second graphical information.

Clause 2. The method of clause 1, wherein the indication of the change from the first power mode to the second power mode is received after outputting, by the application, to the centralized service, an indication that the application supports the second mode of the computing device.

Clause 3. The method of any of clauses 1-2, wherein the first graphical information is output for display in a foreground of a first graphical user interface of the computing device while the computing device operates in the first power mode and the second graphical information is output for display in a foreground of a second graphical user interface of the computing device while the computing device operates in the second power mode.

Clause 4. The method of any of clauses 1-3, wherein: the application outputs the first graphical information to an application processor of the computing device that drives a display while the computing device operates in the first power mode; and the application outputs the second graphical information to a display controller of the computing device that drives the display while the computing device operates in the second power mode.

Clause 5. The method of clause 4, wherein the application executes at the application processor while the computing device executes in both the first and second power modes.

Clause 6. The method of clause 5, further comprising: after outputting the second graphical information for display, outputting, by the application, to the centralized service, an indication that the application is finished executing at the application processor in response to the change from the first power mode to the second power mode.

Clause 7. The method of any of clauses 5-6, further comprising: after outputting the second graphical information for display, outputting, by the application, to the centralized service, an indication that the application is finished outputting the second graphical information to the display controller in response to the change from the first power mode to the second power mode.

Clause 8. The method of any of clauses 1-7, further comprising: while the computing device operates in the second power mode: receiving, by the application, from the centralized service, display policies associated with the second mode, wherein the second graphical information is further generated based on the display policies.

Clause 9. The method of clause 8, wherein the display policies indicate at least one of: a quantity of colors supported by the second mode; or a transition animation supported by the second mode.

Clause 10. A method comprising: detecting, by a centralized service executing at the computing device, a change from a first power mode of a computing device to a second power mode of the computing device; responsive to detecting the change, determining, by the centralized service, a first application, from a plurality of applications executing at the computing device, to notify of the change from the first power mode to a second power mode; outputting, by the centralized service, to the first application, an indication of the change from the first power mode to a second power mode; and responsive to receiving an indication that the first application is finished outputting graphical information to a display controller that is compatible with display properties of the second power mode and in response to the change from the first power mode to the second power mode, suspending, by the centralized service, the display controller of the computing device.

Clause 11. The method of clause 10, wherein the centralized service determines the first application in response to receiving an indication, from the first application, that the first application supports the second mode of the computing device.

Clause 12. The method of any of clauses 10-11, wherein the centralized service determines the first application in response to determining the first application was outputting graphical information in a foreground of a graphical user interface of the computing device prior to detecting the change.

Clause 13. The method of any of clauses 10-12, further comprising: responsive to receiving an indication that the first application is finished executing in response to the change from the first power mode to the second power mode, suspending, by the centralized service, an application processor of the computing device.

Clause 14. The method of clause 13, further comprising: responsive to receiving the indication that the first application is finished executing in response to the change from the first power mode to the second power mode, determining, by the centralized service, a second application, from the plurality of applications executing at the computing device, to notify of the change.

Clause 15. The method of any of clauses 10-14, further comprising: after outputting the indication of the change from the first power mode to the second power mode, receiving, by the centralized service, from the first application, a request to manipulate a display property of a display of the computing device; determining, by the centralized service, a display permission associated with the first application; responsive to determining the display permission satisfies the request, modifying, by the centralized service, based on the request, the display property of the display.

Clause 16. The method of any of clauses 10-15, further comprising: responsive to determining that a threshold amount of time since the application output the graphical information to the display controller, outputting, by the centralized service, to the display controller, a command to update the graphical information to prevent burn-in.

Clause 17. A computing device comprising: an application processor; a display; a display controller; a centralized service module operable by the application processor to: detect a change from a first power mode of the computing device to a second power mode of the computing device; responsive to detecting the change, output, to the application module, an indication of the change from the first power mode to a second power mode; and responsive to receiving an indication that the application module is finished outputting graphical information to the display controller, in response to the change from the first power mode to the second power mode, suspend the application processor; and an application module operable by the application processor to: responsive to receiving the indication of the change from the centralized service module, output graphical information to the display controller for display at the display while the computing device operates in the second power mode; and output the indication that the application module is finished outputting the graphical information to the display controller.

Clause 18. The computing device of clause 17, wherein the graphical information is second graphical information and the application module is further operable by the application processor to: output, to the application processor, first graphical information for display at the display while the computing device operates in the first power mode; and generate, based on the first graphical information, the second graphical information that is compatible with display properties of the display while the computing device operates in the second power mode.

Clause 19. The computing device of any of clauses 17-18, wherein the display is configured to present full-color graphical content while the computing device operates in the first power mode and is further configured to present less than full-color content while the computing device operates in the second power mode.

Clause 20. The computing device of any of clauses 17-19, wherein the computing device is a wearable computing device.

Clause 21. A method comprising: while a computing device operates in a first power mode, outputting first graphical information, by an application executing at the computing device, for display; receiving an indication, by the application from a centralized service executing at the computing device, of a change from the first power mode to a second power mode of the computing device; and while the computing device operates in the second power mode: generating, by the application, based on the first graphical information, second graphical information that is compatible with display properties of the second power mode; and outputting the second graphical information, by the application, for display.

Clause 22. The method of clause 21, wherein the receiving the indication occurs after outputting, by the application, to the centralized service, an indicator that the application supports the second power mode of the computing device.

Clause 23. The method of any of clauses 21-22, wherein the outputting first graphical information comprises outputting the first graphical information in a foreground of a first graphical user interface screen of the computing device while the computing device operates in the first power mode and wherein the outputting the second graphical information comprises outputting the second graphical information in a foreground of a second graphical user interface screen of the computing device while the computing device operates in the second power mode.

Clause 24. The method of any of clauses 21-23, wherein: the outputting the first graphical information sends the first graphical information to an application processor of the computing device for continuously updating a memory of a display controller for drawing a display while the computing device operates in the first power mode; and the outputting the second graphical information to the application processor for periodically updating the memory of the display controller for drawing the display while the computing device operates in the second power mode and re-drawing the display between updates.

Clause 25. The method of any of clauses 21-24, further comprising: after outputting the second graphical information and in response to the receiving the indication, outputting an indication response, by the application to the centralized service, that the application has finished outputting the second graphical information at an application processor.

Clause 26. The method of any of clauses 21-25, further comprising: after outputting the second graphical information and in response to the receiving the indication, outputting an indication response, by the application to the centralized service, that the application has finished outputting the second graphical information.

Clause 27. The method of any of clauses 21-26, further comprising: while the computing device operates in the second power mode: receiving, by the application from the centralized service, display policies associated with the second power mode, wherein the second graphical information is further generated based on the display policies.

Clause 28. The method of clause 27, wherein the display policies indicate at least one of: a quantity of colors supported by the second power mode; or a transition animation supported by the second power mode.

Clause 29. A method comprising: detecting a change, by a centralized service executing at the computing device, from a first power mode of a computing device to a second power mode of the computing device; responsive to detecting the change, determining a first application, by the centralized service, from a plurality of applications executing at the computing device, to notify of the change from the first power mode to a second power mode; outputting an indication, by the centralized service to the first application, of the change from the first power mode to a second power mode; and responsive to receiving an indication response from the first application, suspending, by the centralized service, an application processor of the computing device.

Clause 30. The method of clause 29, wherein the indication response indicates that the first application is finished outputting graphical information that is compatible with display properties of the second power mode in response to the indication.

Clause 31. The method of any of clauses 29-30, wherein the determining the first application occurs after receiving an indicator, from the first application, that the first application supports the second power mode of the computing device.

Clause 32. The method of any of clauses 29-31, wherein the determining the first application comprises: determining the first application was outputting graphical information in a foreground of a graphical user interface of the computing device prior to detecting the change.

Clause 33. The method of clause 29-32, further comprising: responsive to receiving the indication response, determining a second application, by the centralized service, from the plurality of applications executing at the computing device, to notify of the change.

Clause 34. The method of any of clauses 29-33, further comprising: after outputting the indication, receiving, by the centralized service from the first application, a request to manipulate a display property of a screen of the computing device; determining, by the centralized service, a display permission associated with the first application; responsive to determining the display permission satisfies the request, modifying, by the centralized service, based on the request, the display property of the screen.

Clause 35. The method of any of clauses 29-34, further comprising: responsive to determining that a threshold amount of time has elapsed since the receiving the indication response, outputting, by the centralized service to the display controller, a command to update the graphical information.

Clause 36. The method of clause 35, wherein the indication of the change from the first power mode to the second power mode is output less frequently than the command to refresh the graphical information.

Clause 37. A computing device comprising: a display; a display controller, coupled to the display; an application processor; an application module operable by the application processor; and a centralized service module operably by the application processor to: detect a change from a first power mode of the computing device to a second power mode of the computing device; responsive to detecting the change, output an indication, to the application module, of the change from the first power mode to a second power mode; and responsive to receiving an indication response from the application module, suspend the application processor, wherein the application module is operable by the application processor to: responsive to receiving the indication, output graphical information to the application processor for output by the display controller; and output the indication response when the application module has finished outputting the graphical information to the application processor.

Clause 38. The computing device of clause 37, wherein the graphical information is second graphical information and the application module is further operable by the application processor to: output, to the application processor, first graphical information for display while the computing device operates in the first power mode; and generate, based on the first graphical information, the second graphical information.

Clause 39. The computing device of any of clauses 37-38, wherein the display is configured to present full-color graphical content while the computing device operates in the first power mode and is further configured to present less than full-color content while the computing device operates in the second power mode.

Clause 40. The computing device of any of clauses 37-39, graphical information is compatible with display policies associated with the second power mode and the indication response indicates that the application module is finished outputting graphical information with the application processor.

Clause 41. A computer-readable storage medium comprising instructions that, when executed, configure an application executing at, at least one processor of a computing device to: while the computing device operates in a first power mode, output, for display, first graphical information; receive, from a centralized service executing at the at least one processor of the computing device, an indication of a change from the first power mode to a second power mode of the computing device; and while the computing device operates in the second power mode: generate, based on the first graphical information, second graphical information that is compatible with display properties of the second power mode; and output, for display, the second graphical information.

Clause 42. A computer-readable storage medium comprising instructions that, when executed, configure a centralized service executing at, at least one processor of a computing device to: detect a change from a first power mode of a computing device to a second power mode of the computing device; responsive to detecting the change, determine a first application, from a plurality of applications executing at the computing device, to notify of the change from the first power mode to a second power mode; output, to the first application, an indication of the change from the first power mode to a second power mode; and responsive to receiving an indication that the first application is finished outputting graphical information to a display controller that is compatible with display properties of the second power mode and in response to the change from the first power mode to the second power mode, suspend the application processor of the computing device.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage components, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
while a computing device operates in a first power mode, outputting, by an application executing at the computing device, for display, first graphical information;
receiving, by the application from a centralized service executing at the computing device, an indication of a change from the first power mode to a second power mode of the computing device; and
while the computing device operates in the second power mode:
generating, by the application, based on the first graphical information and display policies associated with the second power mode, second graphical information that is compatible with display properties of the second power mode and the display policies associated with the second power mode; and
outputting, by the application, for display, the second graphical information.

2. The method of claim 1, wherein receiving the indication comprises receiving the indication after outputting, by the application, to the centralized service, an indicator that the application supports the second power mode of the computing device.

3. The method of claim 1,
wherein outputting the first graphical information comprises outputting the first graphical information in a foreground of a first graphical user interface screen of the computing device while the computing device operates in the first power mode, and
wherein outputting the second graphical information comprises outputting the second graphical information in a foreground of a second graphical user interface screen of the computing device while the computing device operates in the second power mode.

4. The method of claim 1, wherein:
outputting the first graphical information comprises sending the first graphical information to an application processor of the computing device for continuously updating, at a first rate, a memory of a display controller for drawing a display while the computing device operates in the first power mode; and
outputting the second graphical information comprises sending the second graphical information to the application processor for periodically updating, at a second rate, the memory of the display controller for drawing the display while the computing device operates in the second power mode and re-drawing the display between updates, wherein the second rate is less than the first rate.

5. The method of claim 1, further comprising:
after outputting the second graphical information and in response to the receiving the indication, outputting, by the application to the centralized service, an indication of a response that the application has finished outputting the second graphical information at an application processor.

6. The method of claim 1, further comprising:
after outputting the second graphical information and in response to the receiving the indication, outputting, by the application to the centralized service, an indication of a response that the application has finished outputting the second graphical information.

7. The method of claim 1, further comprising:
while the computing device operates in the second power mode:
receiving, by the application from the centralized service, the display policies associated with the second power mode.

8. The method of claim 7, wherein the display policies indicate at least one of:
a quantity of colors supported by the second power mode; or
a transition animation supported by the second power mode.

9. A method comprising:
detecting, by a centralized service executing at the computing device, a change from a first power mode of a computing device to a second power mode of the computing device;
responsive to detecting the change, determining, by the centralized service, from a plurality of applications executing at the computing device, a first application to notify of the change from the first power mode to a second power mode;
outputting, by the centralized service to the first application, an indication of the change from the first power mode to a second power mode;
responsive to receiving an indication response from the first application, suspending, by the centralized service, an application processor of the computing device; and
responsive to determining that a threshold amount of time has elapsed since the receiving the indication response, outputting, by the centralized service to a display controller, a command to update the graphical information.

10. The method of claim 9, wherein the indication response indicates that the first application is finished outputting graphical information that is compatible with display properties of the second power mode in response to the indication.

11. The method of claim 9, wherein determining the first application comprises determining the first application after receiving, from the first application, an indicator that the first application supports the second power mode of the computing device.

12. The method of claim 9, wherein determining the first application comprises:
determining the first application was outputting graphical information in a foreground of a graphical user interface of the computing device prior to detecting the change.

13. The method of claim 9, further comprising:
responsive to receiving the indication response, determining, by the centralized service, from the plurality of applications executing at the computing device, a second application to notify of the change.

14. The method of claim 9, further comprising:
after outputting the indication, receiving, by the centralized service from the first application, a request to manipulate a display property of a screen of the computing device;
determining, by the centralized service, a display permission associated with the first application;
responsive to determining the display permission satisfies the request, modifying, by the centralized service, based on the request, the display property of the screen.

15. The method of claim 9, further comprising:
- while operating in the first power mode, sending, by the centralized service, to the application processor, updated graphical information at a first rate; and
- while operating in the second power mode, sending, by the centralized service, to the application processor, the updated graphical information at a second rate that is lower than the first rate.

16. A computing device comprising:
- a display;
- at least one processor;
- a memory that stores instructions associated with an application and instructions associated with a centralized service, wherein:
  - the instructions associated with the centralized service, when executed, cause the at least one processor to execute the centralized service; and
  - the instructions associated with the application, when executed, cause the at least one processor to:
    - while the computing device operates in a first power mode, output, for display at the display, first graphical information;
    - receive, from the centralized service executing at the processor, an indication of a change from the first power mode to a second power mode of the computing device; and
    - while the computing device operates in the second power mode:
      - generate, based on the first graphical information and display policies associated with the second power mode, second graphical information that is compatible with display properties of the second power mode and the display policies associated with the second power mode; and
      - output, for display at the display, the second graphical information.

17. The computing device of claim 16, wherein the display is configured to present full-color graphical content while the computing device operates in the first power mode and is further configured to present less than full-color content while the computing device operates in the second power mode.

18. The computing device of claim 16, wherein the instructions associated with the application, when executed, further cause the processor to:
- while the computing device operates in the second power mode:
  - receive, from the centralized service, the display policies associated with the second power mode.

19. The computing device of claim 16, wherein the display policies indicate at least one of:
- a quantity of colors supported by the second power mode; or
- a transition animation supported by the second power mode.

20. The computing device of claim 16, wherein the instructions associated with the application, when executed, cause the processor to receive the indication after outputting, to the centralized service, an indicator that the application supports the second power mode of the computing device.

* * * * *